United States Patent [19]

Jones

[11] 3,844,624
[45] Oct. 29, 1974

[54] BRAKE SYSTEMS
[75] Inventor: Roger D. Jones, Ramsey, N.J.
[73] Assignee: Abex Corporation, New York, N.Y.
[22] Filed: Aug. 27, 1973
[21] Appl. No.: 391,850

[52] U.S. Cl. .............................. 303/21 A, 303/22 R
[51] Int. Cl. .............................................. B60t 8/18
[58] Field of Search...... 303/6 R, 6 C, 10, 11, 21 R, 303/21 A, 21 F, 21 FP, 21 FM, 22 R, 22 A, 28, 68

[56] References Cited
UNITED STATES PATENTS
3,443,842 5/1969 Pier................................ 303/21 A X
3,588,187 6/1971 Mueller............................ 303/21 A

Primary Examiner—Duane A. Reger
Attorney, Agent, or Firm—Kinzer, Plyer, Dorn & McEachran

[57] ABSTRACT

A brake system in which brake control units are isolated for redundancy and including a comparator to detect unacceptable degradation in available fluid pressure.

30 Claims, 6 Drawing Figures

BRAKE SYSTEMS

This invention relates to a hydraulic brake system and in particular to a hydraulic brake system for a railroad car.

Transportation needs in large urban communities have prompted consideration of rapid transportation rail systems involving stopping distances, emergency brake modes and responses difficult to reconcile with speed requirements and safety. For example, it has been determined that stringent anti-skid requirements promulgated by some urban transportation authorities can only be satisfied by hydraulic brake systems. By anti-skid is meant elimination of the circumstance, during brake application, where the brake force exceeds the adhesion of the wheel to the rail, meaning that a wheel no longer rolls on the rail but rather skids on the rail, an unacceptable condition since the wheel tends to flatten with consequent stressing likely to lead to wheel failure. To achieve anti-skid correction in a hydraulic brake system is only one example of many criteria representative of objectives to be accomplished under the present invention. Other objects of the invention are to develop isolated brake control units for individual wheel sets, as in a railroad car, providing safety through redundancy; to develop a comparator which compares pressure prevailing in separate brake cylinder systems to detect unacceptable degradation and initiate a safe response; and to continually monitor available brake pressure and initiate an emergency stop in the event of pressure loss.

More specifically it is an object of the present invention to achieve redundancy by providing an accumulator for each brake unit identified with an individual set of wheels on the vehicle (as for example the wheels on the front and rear truck of a railroad car) each accumulator being charged from a common source of hydraulic power but isolated from one another and from the power unit by check valves so that failure of one accumulator (a leak for example) has no effect on another, the later remaining capable of producing a stop; inability of an accumulator to retain a safe charge causes a switch to be actuated to institute an emergency brake action.

Other specific objects of the invention are to safeguard the hydraulic power unit against back flow by means of a shuttle valve, to stabilize a directional flow valve in a unique way; to use a parking brake in an unusual way to preserve the accumulator charges when the vehicle is parked; and to control a directional valve both electrically and pneumatically.

GENERAL DESCRIPTION

Figure 1:
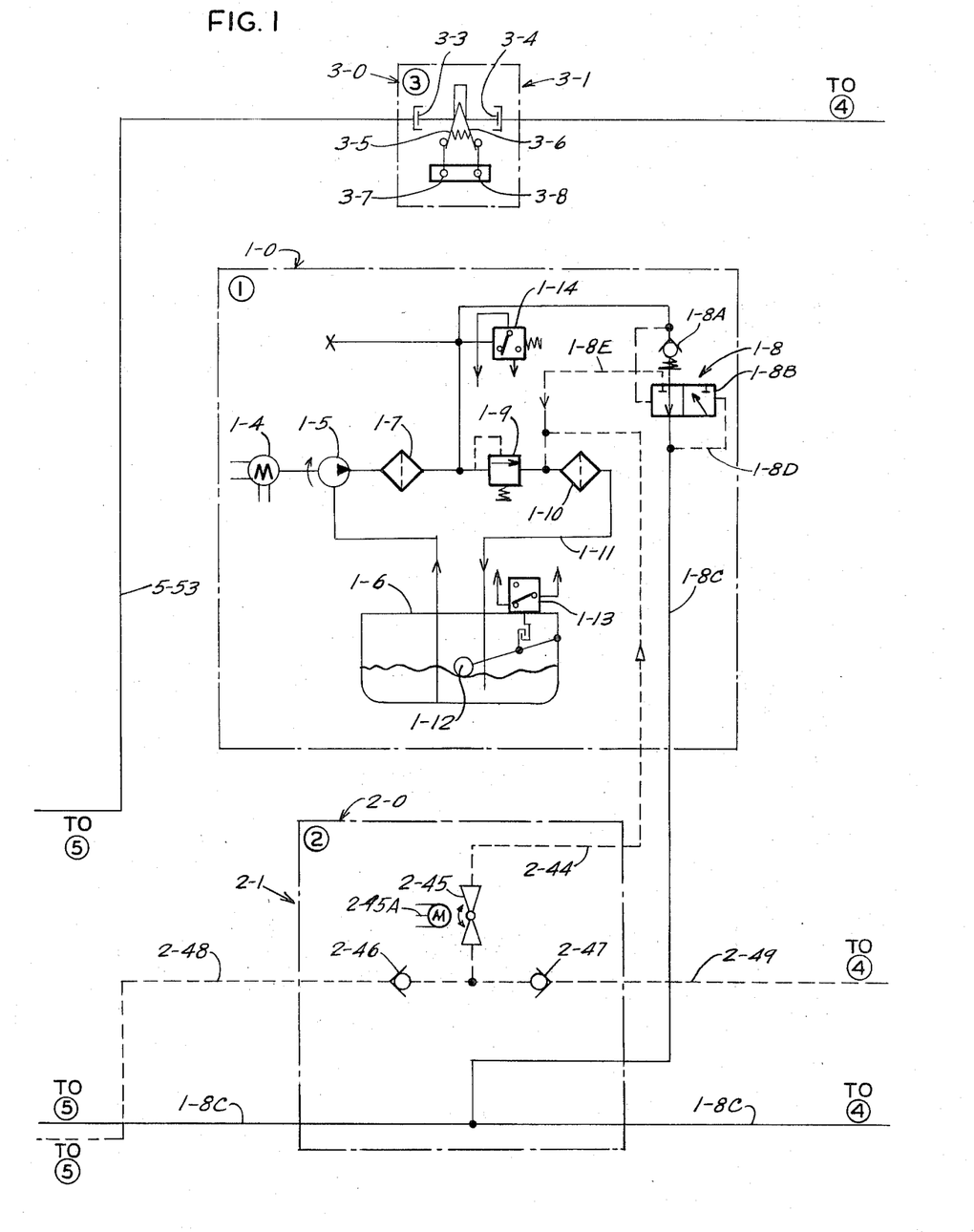
FIGS. 1, 1A, 1B and 1C constitute a schematic and diagrammatic of the brake system of the present invention; and, FIGS. 2 and 2A are a schematic view of the installation.
Figure 1A:
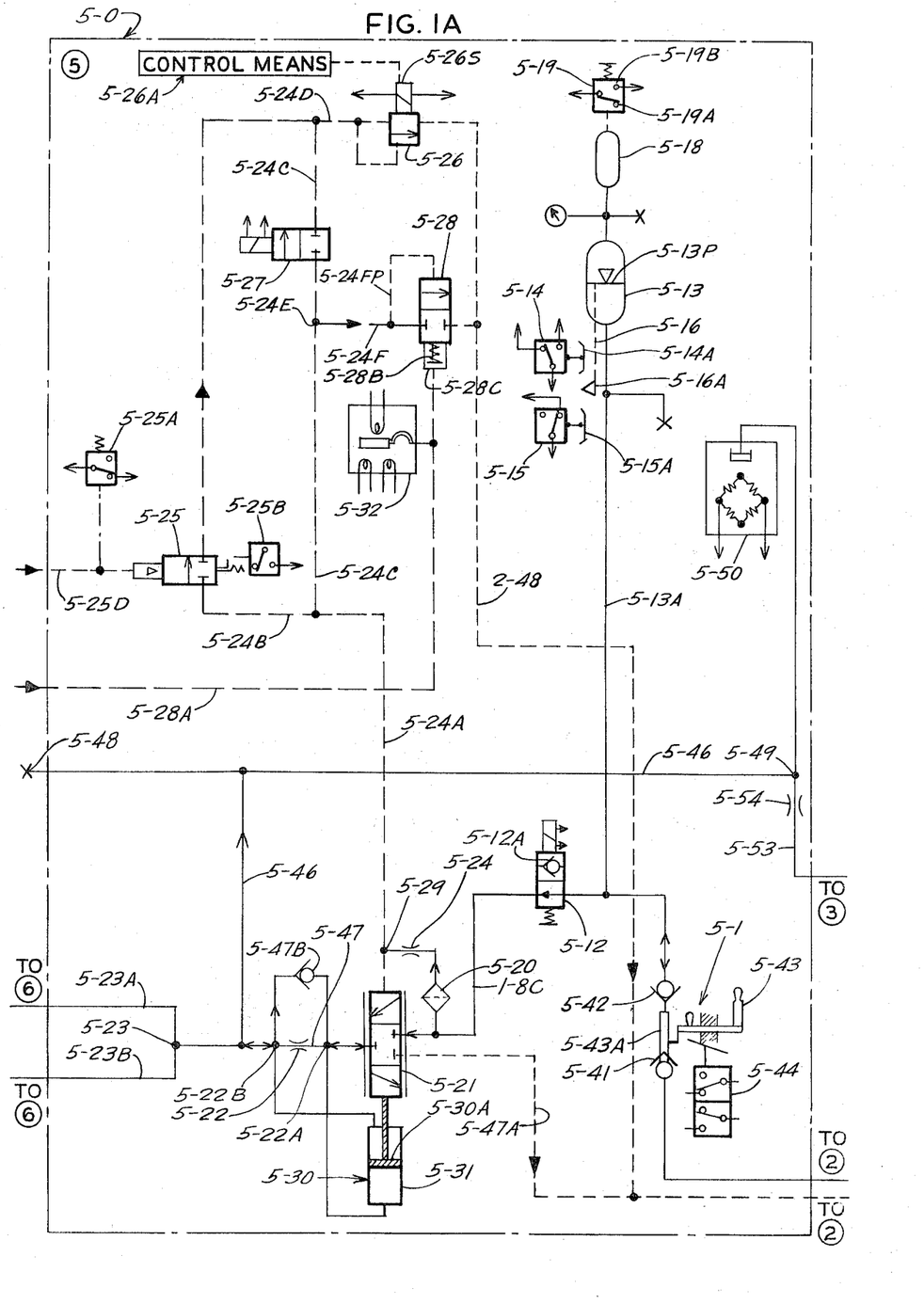
Figure 1B:
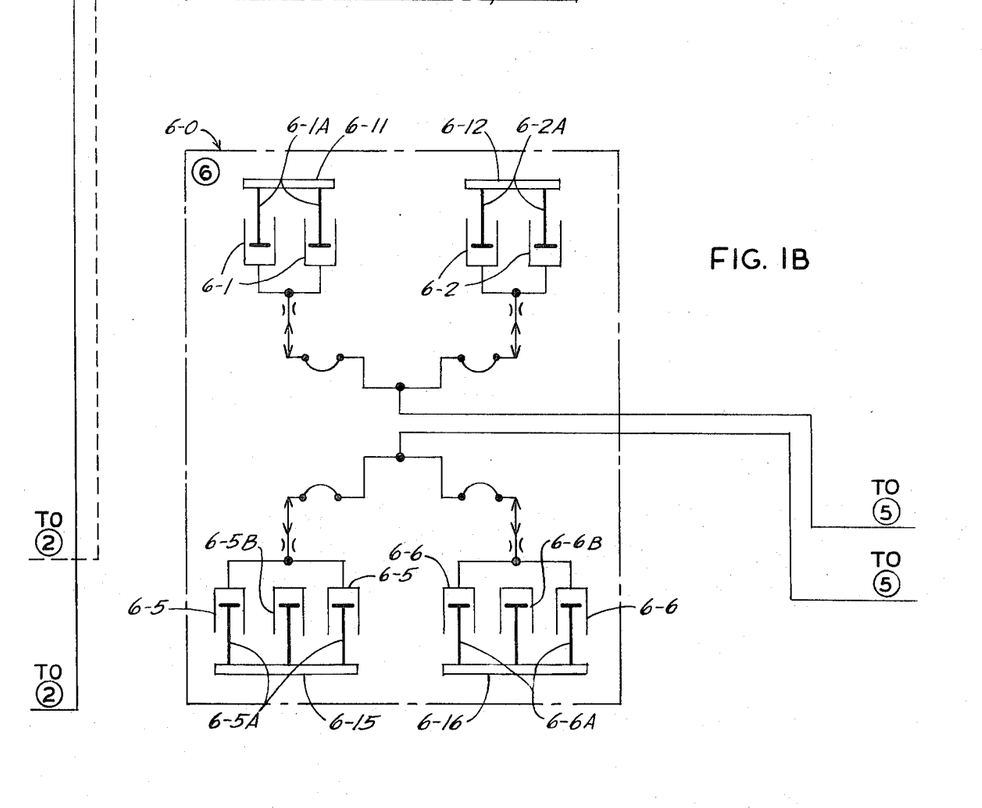

The system shown in FIGS. 1, 1A, 1B, and 1C supplies fluid under pressure to the brake cylinders associated with the wheels of a vehicle such as the wheels of a railroad car. In the system illustrated, the brake cylinders associated with one end of the vehicle are shown in FIG. 1B as 6-0. The cylinders are operated by brake control unit 5-0 in FIG. 1A. Another duplicate set of cylinders, 7-0 in FIG. 2 are operated by a second brake control unit 4-0 in FIG. 2 or FIG. 1C. Brake control units 4-0 and 5-0 are for all practical purposes identical. The brake elements are not shown; they are preferably the calipers of a disk brake, but obviously the cylinders 6-0 could as well be used to operate conventional segment or tread brakes. One advantage is that the brake control units may be duplicated for additional wheels on the vehicle in such multiples as required.

Hydraulic fluid for operating the cylinders is supplied by an accumulator 5-13, FIG. 1A, being delivered, on command, through a brake mode valve 5-12 to a three way directional flow valve 5-21. A brake command may be viewed as one which sets valve 5-12 in the position shown in FIG. 1A where full accumulator pressure may prevail at the inlet of valve 5-21, normally in a released position, and also at junction 5-29 in the pressure control system line 5-24A, shifting valve 5-21 to connect hydraulic lines 1-8C and 5-47 enabling hydraulic fluid to rush to the brake cylinders.

Thus, with valve 5-12 in the position shown, accumulator pressure may prevail at junction 5-29 tending to shift the spool of valve 5-21 to the "brake apply" position. There are several valves which service the control system line 5-24A and effective in the open position to divert accumulator fluid from pressure point 5-29 to a return conduit, line 2-48, which returns fluid to the tank or reservoir or 1-6, FIG. 1; the principal one of these valves is a variable orifice brake pressure control valve 5-26. If any of the servicing valves is open when accumulator pressure tends to prevail at point 5-29, then accumulator pressure at point 5-29 is reduced proportionally, reducing the pressure of fluid being passed through valve 5-21 to operate the brake cylinders. On the other hand if there is no diminution of accumulator pressure at point 5-29 when valve 5-12 is open, then a maximum brake force can be applied through valve 5-21.

When the pressure in the brake cylinders equals the brake pressure called for by valve 5-26, valve 5-21 will shift to its null position and no further fluid will be delivered to the brake cylinders. The null position will occur only when the pressure at junction 5-29 is creating the desired pressure in the brake cylinders.

To release the brakes, valve 5-21 is positioned to connect line 5-47, FIG. 1A, with return line 5-47A; return flow is unrestricted. A reduction in brake cylinder pressure automatically follows a reduction in pressure at 5-29. This is caused by the value repositioning resulting from the force of differential piston 5-31 overcoming the force at junction 5-29.

Return flow fron one set of brake cylinders occurs through a conduit 2-48, FIG. 1, and separately through a conduit 2-49 from another set of brake cylinders, returning fluid after brake release to reservoir 1-6. The two return conduits have opposed check valves 2-46 and 2-47 to isolate the separate sets of brake cylinders.

A requirement occasionally arises to eliminate the braking capability of one control unit. This is done by operating cut-out valve 5-43 causing accumulator 5-13 to return its fluid to reservoir 1-6. In this operation the pump is protected from back pressure by a check valve 1-8A and a shuttle valve 1-8B together assuring that any excessive back pressure causes fluid to be diverted directly to the reservoir.

A parking brake valve 2-45, FIG. 1, may be closed to maintain system pressure when the vehicle is idled; again, check valves 2-46 and 2-47 isolate, in case of failure in either system, the respective accumulators which bleed fluid to the brake cylinders to set the brakes.

A differential pressure means 3-1 monitors both brake control units at all times to assure that pressure differences do not exceed the normal limit.

Valve 5-21, it will be seen, is the gate for delivering fluid under pressure to actuate the brake cylinders and valve 5-26, presenting an infinitly variable orifice, is the principal source of varying the brake pressure. Valve 5-26 is electromagnetically operated and current is varied by a control means 5-26A which in turn may be varied by a remote computer. However, in the event of loss of air employed in the train air pressure equilization pipe 5-25D of the car, a valve 5-25 closes which in effect prevents valve 5-26 from controlling valve 5-21; an emergency brake mode is initiated in such event and all control over valve 5-21 is assumed by a valve 5-27 (responsive to wheel slip or skid detection during the emergency stop) and a valve 5-28 which is responsive to passenger weight. Thus, valve 5-21 is normally controlled electrically (5-26A) but during an emergency stop it may be controlled pneumatically, the selection being made by valve 5-25.

HYDRAULIC POWER UNIT

Referring to FIG. 1 a motor 1-4 drives a pump 1-5 withdrawing fluid from a reservoir 1-6 for delivery through a filter 1-7 to a shuttle valve means 1-8 which includes a check valve 1-8A and a pressure operated valve 1-8B. Valve 1-8B is normally in the position shown so that fluid from reservoir 1-6 is pumped into a conduit 1-8C.

A pressure relief valve 1-9 is effective to divert fluid, driven through filter 1-7, back to the reservoir in the event of an abnormal pressure. A filter 1-10 is interposed in the pressure relief return line 1-11.

Fluid level in reservoir 1-6 is sensed with a float 1-12 which in turn operates a float switch 1-13.

A sensor 1-14 identifies effective operation of the pump, sensing the pressure at the outlet of pump 1-5 and indicates pump or system failure in the event that loss of pump pressure is sensed when pressure has been called for by a brake control unit.

PARKING BRAKE

As will be explained in more detail hereafter, one important feature of the present brake system is that when the cars are parked the multiple brake systems can be charged to the respective accumulator pressures. In order that this may be accomplished a parking brake valve 2-45 is interposed in the return line 2-44 described in more detail hereafter. Also provided are a pair of opposing check valves 2-46 and 2-47 respectively interposed in the return conduit 2-48 associated with the rear brakes of the vehicle and return conduit 2-49 associated with the front brakes of the vehicle. Valve 2-45 can be motorized and driven under certain conditions by motor 2-45A, or manually controlled.

ACCUMULATOR AND BRAKE CONTROL UNITS

Conduit 1-8C leads through a selective means 5-1, FIG. 1A, characterized by two check valves 5-42 and 5-41 which will be described in more detail hereafter. Conduit 1-8C continues through the selective means and communicates with electromagnetically controlled brake mode valve 5-12.

Brake mode valve 5-12 when closed diverts fluid from line 1-8C to the accumulator 5-13. Accumulator 5-13 is the instantaneous source of hydraulic fluid under pressure for the brake cylinders, accumulator 5-13 receiving fluid from reservoir 1-6, delivered by pump means 1-5.

A pair of sensing switches 5-14 and 5-15 are arranged adjacent an indicator element 5-16 which is so associated with accumulator 5-13 as to in effect travel as the pressure within the accumulator varies. Energy within the accumulator is stored by a tank 5-18 of pressurized nitrogen, and the pressure of the nitrogen is sensed by a pressure responsive switch 5-19. Details of operation of indicator 5-16 will be set forth in more detail below but it may be mentioned here that when the accumulator pressure is approaching, low normal level, switch 5-14 is closed to energize motor 1-4; conversly when switch 5-14 is opened by indicator 5-16 this indicates that the accumulator is fully charged and motor 1-4 is deenergized. Switch 5-15 opens if the pump 1-5 fails to restore the fluid causing the indicator actuator 5-16A to pass contact 5-15A signalling an emergency low level of fluid.

Conduit 1-8C terminates at a continuously variable three-way directional valve 5-21. When valve 5-21 is in the null and release positions, any hydraulic fluid under pressure in conduit 1-8C (having traversed valve 5-12) is diverted through a screen 5-20 and an orrifice 5-24 to a control system line 5-24A in turn connected to one side of directional valve 5-21.

As will be described hereafter flow of fluid under pressure through directional valve 5-21 when properly positioned passes an orifice 5-22 to a junction 5-23 where fluid is diverted to a line 5-23A leading to one set of brake cylinders 6-1 and 6-2, and line 5-23B leading to another set of brake cylinders 6-5 and 6-6.

Control system line 5-24A divides into two parallel conduits 5-24B and 5-24C which merge into conduit 5-24D where the fluid passes through the main control valve 5-26 and passes out of main control valve 5-26 to return conduit 2-48 referred to above in connection with the parking brake. Interposed in conduit 5-24B is an emergency block valve 5-25 which is a normally closed valve. In this connection it may now be mentioned that the components are shown in the drawing in the normal state defined as the deenergized or failsafe condition; that is, with the vehicle idle. The emergency block valve 5-25 is operated by air pressure which is sensed by switch 5-25A. Another switch 5-25B signals various other emergency operation modes which will be described later.

Interposed in conduit 5-24C is junction 5-24E which may divert fluid through conduit 5-24F to the overload relief valve 5-28. The overload relief valve allows only maximum braking pressure proportional to vehicle weight in the control system line 5-24A and any pressure in excess of this will be bled through overload relief valve 5-28 to return conduit 2-48. The effect of overload relief valve 5-28 varies according to the number of people in a car which is sensed by the air pressure in passenger sensor line 5-28A. Additionally, read out sensor 5-32 electrically signals the number of passengers to a control means 5-26A which controls main control valve 5-26, in a manner which will be described later. Thus, maximum bleed of fluid under pressure through overload relief valve 5-28 back to the return conduit 2-48 occurs in the instance of a vehicle with no passengers since the only force holding valve 5-28 closed is bias spring 5-26B which allows the valve to open when the pressure in pilot line 5-24FP reaches a predetermined maximum brake pressure for an empty car. As the number of passengers (weight) increases the pressure in line 5-28A will increase proportionally to the passenger load, adding to spring force of 5-28B will increase proportionally to the passenger load, adding to spring force of 5-28B and requiring a higher pressure in line 5-24FP to open valve 5-28. Since control means 5-26A also receives information about the increase in car weight from sensor 5-32 and accordingly adjusts main control valve 5-26 to bleed excess pressure, overload valve 5-28 will function only in emergency modes or if valve 5-26 is stuck closed. Thus, the emergency block valve 5-25 provides for control of directional valve 5-21 by either the electrical control of main control valve 5-26 or the pneumatic control of overload relief valve 5-28. The overload relief valve can be a pressure relief valve.

Conduit 5-24C continues from junction 5-24E to the moderating valve 5-27 which is an electromagnetically controlled valve with a normally closed position. This valve operates to provide pressure bleed from conduit 5-24C to line 5-24D under abnormal operating conditions. For example, when it is determined that different rotation speeds prevail in the axles which characterizes wheel slip or wheel slide as it is sometimes called, moderating valve 5-27 will open and fluid bled into conduit 5-24D can pass through the main control valve 5-26 into return conduit 2-48.

Main control valve 5-26 is a normally open valve. During running of the car without brakes being applied, main control valve 5-26 will be open. Main control valve 5-26 can be a solenoid operated variable orifice valve controlled by control means 5-26A which may be a logic computor which in effect supplies a signal to the solenoid of valve 5-26 proportional to the brake pressure to be applied as will be apparent from the description to follow. During normal operation of a car when the brakes are desired to be applied the control means 5-26A will signal control valve 5-26 to close. This will cause a pressure buildup in the control system line 5-24A and accordingly an increase in pressure at junction 5-29 which will drive the three-way directional valve 5-21 downward as viewed in the drawing allowing fluid in conduit 1-8C to flow into orifice 5-22.

Valve 5-21 is stabilized by a release means 5-30 which may comprise cylinder 5-31 and differential area piston 5-30A. The end of cylinder 5-31 corresponding to the larger area of piston 5-30A is communicated to a junction 5-22A at the upstream side of orifice 5-22. The end of cylinder 5-31 corresponding to the smaller area of piston 5-30A is connected to a junction point 5-22B on the downstream side of orifice 5-22. Consequently, when valve 5-21 is positioned to communicate hydraulic fluid under pressure in the accumulator 5-13 to orifice 5-22 the resulting flow across 5-22 causes a pressure to appear at junction 5-22A and this pressure is communicated to the larger area of piston 5-30A tending to move the directional valve 5-21 in the opposite or closing direction. A pressure also will later prevail at the junction 5-22B on the downstream side of orifice 5-22 communicating with the smaller area of piston 5-30A so that the effect on piston 5-30A is a differential force represented by the differential piston area and the difference in upstream and downstream pressure which tends to stabilize valve 5-21. Thus, directional valve 5-21 is opened to allow delivery of fluid under pressure to junction 5-23 where it is diverted to the braking cylinders.

There was reference above to the selective means 5-1. The selective means 5-1 may include a pair of oppositely acting check valves 5-41 and 5-42. Either check valve may be moved to an open position by operating a handle 5-43 which in turn positions a cam 5-43A to urge either check valve to an open position. Normally, handle 5-43 is positioned so that cam 5-43A is effected to hold check valve 5-41 in the open position permissive of pump 1-5 delivering fluid to accumulator 5-13. An indicator switch 5-44 is located adjacent the selective means 5-1 indicating what position handle 5-43 is in to the control means 5-26A. This switch is so connected to inhibit the pump control of switch 5-14 when the handle is selected to open valve 5-42. Cam 5-43A will be positioned to hold open check valve 5-42, permitting check valve 5-41 to close, when it is desired to disable the brake system of the set of car wheels being controlled.

Provision is made for establishing a brake cylinder test point and for enabling brake cylinder pressure to be observed. Thus, a conduit 5-46 is connected at one end to the line 5-47 which contains orifice 5-22. Line 5-46 is branched to a brake cylinder test point 5-48 and to a junction 5-49 connected on one side to a pressure sensitive transducer 5-50.

A conduit 5-53 leads from junction 5-49 to differential pressure analyzer 3-1 as will be described hereafter. Interposed in conduit 5-53 is a reducing orifice 5-54.

THE BRAKE CYLINDERS

The present brake system may be used on a railroad car characterized by the usual truck for the front wheel, two axles and four wheels, and the usual truck for the rear wheels, again two axles and four wheels. What is shown in the drawing, FIG. 1B, relates to the supply of fluid under pressure to the service brake cylinders for the rear wheels. The system for the service cylinders for the front wheels is identical (with one exception to be noted) as exemplified for example by selective means 4-1, FIG. 1C, for the front wheels identical to selective means 5-1 described above in connection with the rear wheels.

Referring to FIG. 1B the service brake cylinders are schematically identified as comprising two cylinders 6-1 and two cylinders 6-2 for operating a related pair of drive pistons 6-1A and 6-2A which actuate a pair of disc brakes 6-11 and 6-12 associated with the two wheels on one side of the car truck at the rear of the vehicle. In a like manner there are a pair of cylinders 6-5 and 6-6 for operating a related pair of drive pistons 6-5A and 6-6A which actuate a pair of disc brakes 6-15 and 6-16 associated with the remaining two wheels at the rear of the car truck.

Manual hand brake cylinders 6-5B and 6-6B are outside the main control system.

DIFFERENTIAL PRESSURE ANALYZER

Figure 1C:
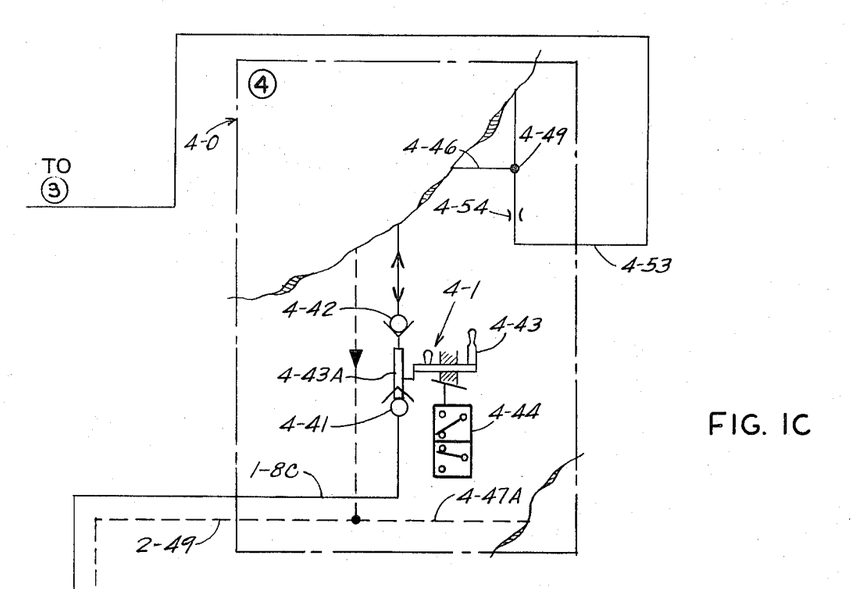
Figure 2:
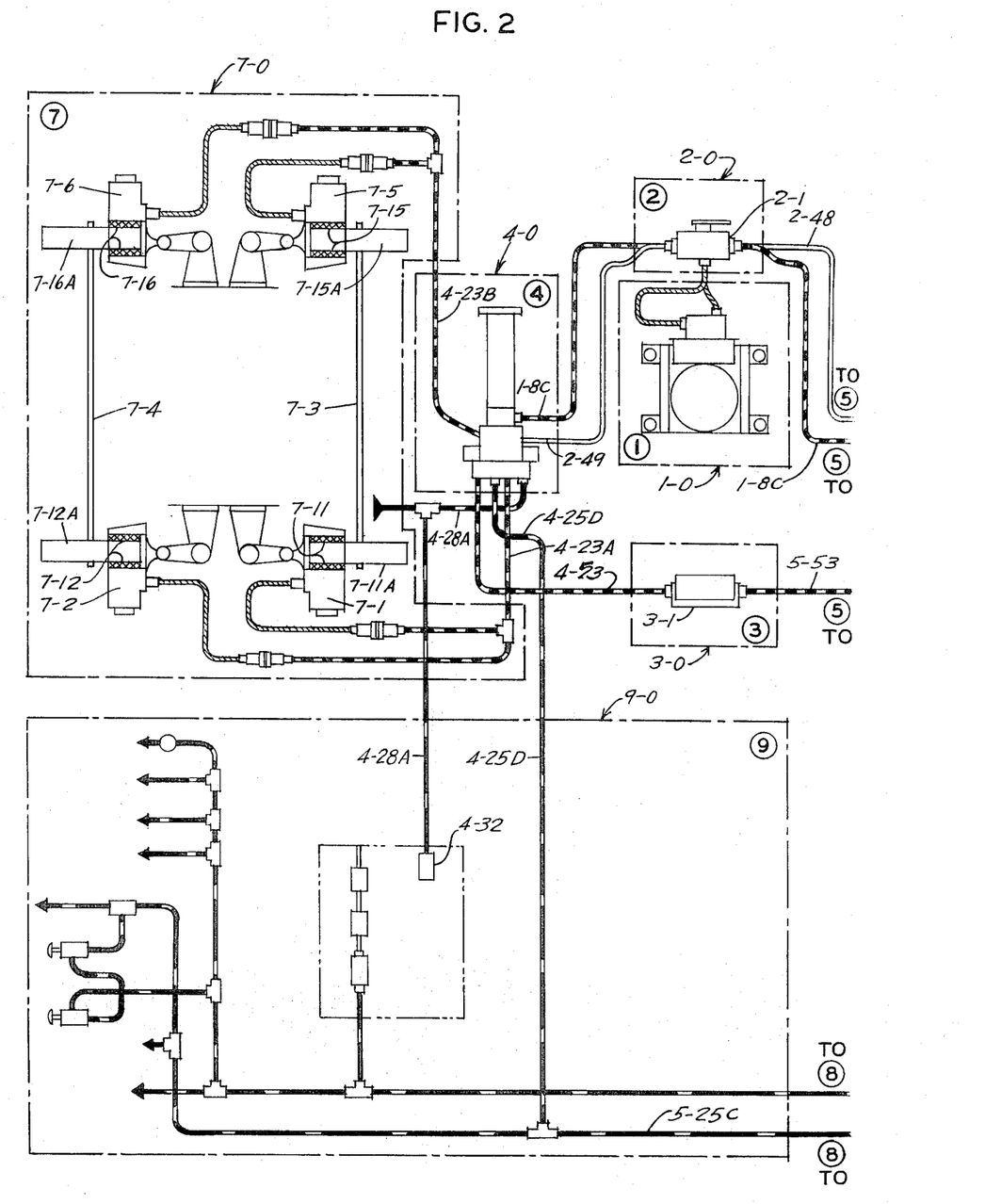

A differential pressure analyzer 3-1 is interposed between the rear braking system which has been previously described and the front braking system which is partially shown in FIG. 1C which is similar to and readily described the same as the rear braking system with the addition of a front accumulator pressure read out meter (not shown) constituting the exception noted above.

The pressure at junction 5-23 is communicated to one cylinder 3-3 of the differential pressure analyzer 3-1 through an orifice 5-54 which reduces the amount of flow. Similarly, the pressure from the front braking system at a similar point (not shown) is communicated through orifice 4-54 to the other cylinder 3-4 of the differential pressure switch 3-1. Differential pressure analyzer 3-1 compares the braking pressure in the front and rear trucks and if a difference of greater than about 100–125 PSI is noted, a signal is sent to control means 5-26A which will not allow the train to start after its next stop unless overriden by the operator. For example if the pressure at cylinder 3-3 is 130 PSI greater than the pressure at cylinder 3-4 the cylinder is driven from left to right as shown in the drawing causing contact arm 3-5 to acctuate switch 3-7 signaling the control means 5-26A to go into fail-start operation; similarly, if the pressure is 130 PSI greater on cylinder 3-4 than 3-3 contact arm 3-6 will actuate switch 3-8, causing a fail-start signal to be transmitted to control means 5-26A.

SEQUENCE OF OPERATION

The initial condition shown in the drawing is assumed to be characterized by all power off after long term storage and after the selective means 5-1 (and 4-1) have been positioned to hold check valve 5-42 (and 4-42) in the open position with check valve 5-41 (and 4-41) in the closed position. This position of the selective means 5-1 and 4-1 is the reverse position of that shown in the drawing and permits all fluid in the accumulators and any in the brake cylinders as well to be drained to the reservoir through shuttle valve 1-8. In this connection, it will be observed that pressure in the accumulator forcing fluid in conduit 1-8C toward the pump 1-5 is blocked by check valve 1-8A causing the pressure to act on shuttle valve 1-8 through the pilot pressure line 1-8D shifting valve 1-8B leftward as viewed in the drawing permitting all fluid to drain through return line 1-8E back to the reservoir. Eventually all pressure in the system and conduit 1-8C is discharged and valve 1-8B returns to the position shown in the drawing.

As before, only the operation of the rear brake system will be described, which is identical to the front system. Incidental to restoring pressure for normal brake operation, selective means 5-1 is positioned as shown in the drawing forcibly to hold open check valve 5-41. Further, the indicator switch 5-44, operated electrically, is actuated to the normal position. Moreover, parking brake valve means 2-45 should be opened; if it is motorized, it will open automatically if electric power is on as signalled by control means 5-26A. Fluid under pressure from pump 1-5 will pass through selective means 5-1 to brake mode valve 5-12.

The switch position of 5-14 will cause the pump motor to turn with the accumulator in its depleted state. When motor 1-4 is energized the associated pump 1-5 is driven, withdrawing fluid from the reservoir 1-6, pumping the fluid through filter 1-7 and shuttle valve 1-8. Relief valve 1-9 will not pass fluid in normal operation, opening only in the event an excessively high pressure is detected. Fluid for charging the accumulator thus passes unimpeded through the parking brake unit 2-1.

The flow of hydraulic fluid from pump 1-5 passes through the two check valves 5-41 and 5-42, is blocked by the spool of valve 5-21 as the brake cylinders are pressurized and therefore flows to accumulator 5-13. It is assumed that the accumulator is not charged with fluid, having been previously drained as explained above. Consequently, the accumulator piston 5-13P, unlike the position shown in the drawing, would normally be disposed in what may be termed the accumulator-discharge position with the actuator 5-16A on the indicator 5-16 displaced beneath contact 5-15A associated with switch 5-15.

At a pressure predetermined by an accumulator precharge pressure present in charger 5-18, which is conveniently provided by nitrogen gas at a pressure of 765 PSI, the accumulator piston 5-13P begins moving upwardly as viewed in the drawing. When actuator 5-16A is displaced upwardly past contact 5-15A any previous "low system fluid caused" emergency command is removed as hereafter explained. Accumulator 5-13 will continue to fill and pressure will rise until actuator 5-16A is retracted past contact 5-14A of switch 5-14.

When contact 5-14A is actuated by actuator 5-16A, this signals the control means 5-26A to deenergize the circuit to motor 1-4, interrupting operation of the pump. Rear switch 5-14 operates in conjunction with a similar switch in the front truck so that the pump is not turned off until both front and rear accumulators are charged. Actuation of switch 5-14 identifies the circumstance where the accumulator is sufficiently charged by pump 1-5 for normal brake operation. Should switch 5-14 fail to operate, valve 1-9 in the hydraulic power unit prevents excess pressure build up by releasing excess high pressure fluid to the reservoir.

Switch 5-14 must be opened to stop motor 1-4. It was mentioned above that the system of components shown in the drawing for controlling operation of the brakes of the rear wheels of the vehicle is duplicated for the front wheels of the vehicle so that there is a switch similar to switch 5-14 associated with the front wheel brake system. The switch 5-14 (rear wheels) and the associated switch for the front wheels are wired in parallel so that both must be open to generate a signal to deenergize motor 1-4. Similarly, there is a front wheel brake system switch in series with switch 5-15 so that both must close to remove any emergency signal due to low fluid level in the accumulator. If switch 5-15 opens during operation of the car, it can be connected to a circuit which depleates the pressure in the air equalization pipe 5-25C which initiates the emergency brake.

Normal accumulator brake fluid charge places the actuator 5-16A between the toggle positions of switch 5-14. During charging of the accumulator with hydraulic fluid, switch 5-19 will be moved to the closed position at a predetermined pressure, for example, at about 890 PSI, removing any associated accumulator precharge directed emergency signal. This provides for a dual emergency operation signals from loss of accumulator pressure. Thus, if the nitrogen tank 5-18 should leak while indicator 5-16 where upward of contact 5-14A indicating that the accumulator was charged then switch 5-19 would indicate the loss in pressure and establish a signal requiring the system to be put into emergency operation.

In connection with the foregoing, it may be noted that when the accumulator is at a pressure less than normal operating pressure, the contact arm of switch 5-19 is disposed on switch contact 5-19A causing the pre-charge emergency signal to be originated. When pressure builds up in the accumulator to that required for normal operation, the contact arm of switch 5-19 is disposed from contact 5-19A and the contact arm is engaged with contact 5-19B indicating a normal operating condition. A similar switch is of course associated with the front wheel brake system. Switch 5-19 is connected in series with switch 5-15 so that if either opens an emergency mode (apply emergency brake or initiate fail-start) will be initiated; the same is true for the front truck control unit. Thus, there are four switches which must be closed to re-move any emergency mode signal; 5-15, 5-19 and the corresponding switches associated with the accumulator for the front truck brake cylinders.

The accumulator being charged and fully operative, the vehicle is preconditioned for the so-called propulsion mode; brake mode valve 5-12 will be closed and check valve 5-42 is closed from the accumulator direction. Thus, each accumulator system (front and rear) is a self contained power system, one separated from the other.

During vehicle operation in the propulsion mode, brake mode valve 5-12 will be given a signal from control means 5-26A, closing the valve by disposing check valve 5-12A in conduit 1-8C. When a brake signal is generated, valve 5-12 is opened to the position shown in the drawing. The accumulator then supplies fluid through open valve 5-12 to the directional valve 5-21. When this valve is displaced from its normal brake release position to the brake applying position as hereinafter described, fluid under pressure moves through orifice 5-22 to the service brake cylinders 6-1, 6-2, 6-5 and 6-6 referred to above. It should be noted that valve 5-21 is shown in the drawing in the null position, but normally would be in the brake release position.

The directional flow valve 5-21 is controlled by several different sources but is operated by pilot pressure diverted to pressure point 5-29 through screen 5-20 and orifice 5-24. Under "brake released" conditions the pressure at point 5-29 is near zero. Point 5-29 may be viewed as the command point pressure controlled by valves interposed in control system line 5-24A as will be described hereafter.

Under "brake released" conditions emergency block valve 5-25 and main control valve 5-26 are open; moderating valve 5-27 is closed as no wheel slip correction is being requested; overload relief valve 5-28 would limit the pressure at command point 5-29 to a value proportional to the total rear end weight of the car, but without a brake signal is not in control since valves 5-25 and 5-26 are open.

Normal brake commands are received by main control valve 5-26, conveniently a variable orifice valve, from control means 5-26A and such commands are manifested by a variance in the current to the coil of the solenoid 5-26S associated with valve 5-26. Thus the solenoid receives current proportional to brake cylinder pressure required so that the strongest brake command signal is characterized by complete closure of main control valve 5-26.

Pressure at command point 5-29 is communicated as pilot pressure to valve 5-21 and shifts directional valve 5-21 to the brake applying position, communicating orifice 5-22 with line 1-8C to supply brake applying pressure as already noted. The sudden surge of high pressure fluid to point 5-22A at the upstream side of orifice 5-22, and the drop in pressure across orifice 5-22, communicated to opposite sides of cylinder 5-31, operates on piston 5-30A to prevent oscillation of the directional valve 5-21. As brake cylinder pressure increases to the desired level and remains constant during application of the brakes pressure equalizer across orifice 5-22 and a net upward force (as viewed in the drawing) is transmitted to piston 5-30A equally opposes the downward forces. Thus the upward force of piston 5-30A counteracts the downward command from pilot pressure at point 5-29, moving directional valve 5-21 to its null position blocking further flow from conduit 1-8C to brake cylinders.

In emergencies, emergency block valve 5-25 is closed by removing its pilot air pressure from the train air equalization pipe line 5-25D. Closing valve 5-25 causes the pressure at 5-29 to rise to the maximum limited by overload relief valve 5-28. The minimum pressure that will open overload relief valve 5-28 is established by a bias spring causing brake pressure sufficient for an emergency stop with an empty car. If the pressure in line 5-24FP increases sufficient to counteract the spring, valve 5-28 bleeds excess pressure and hydraulic fluid to return line 2-48. The bias spring is re-enforced as the car load is increased by air pressure from the suspension system acting on cylinder 5-28C.

While emergency block valve 5-25 is closed and overload relief valve 5-28 is in control, if an abnormal condition such as wheel slip occurs, the moderating valve 5-27 is opened by control means 5-26A to reduce the pressure at point 5-29 and avoid wheel slip. Thus, in emergency operation, main control valve 5-26 is open to allow sufficient pressure reduction to stop the slipping condition. This is done proportionally to the amount of slip, with full opening at a difference in speed of the axle pair of about five mph. This proportional release of brake pressure avoids the disadvantages of other anti-slip systems with only full off or full on brake pressure commands and provides a smoothness of operation and better braking capabilities.

To release brake pressure, a pressure reduction at 5-29 occurs when valve 5-25 is open and valve 5-26 receives a signal to allow opening of valve 5-26. Pressure in line 5-47 communicates with release means 5-30 so that the force upward on piston 5-30A applied to the spool of valve 5-21 is greater than the force exerted downward from point 5-29, the pressure at point 5-29 being released through conduit 5-24A, 5-24B and 5-24D to the return conduit 2-48. Thus, the directional valve 5-21 is shifted to its brake release position thereby connecting the brake cylinders to the return line 5-47A which communicates with return conduit 2-48 which in turn communicates with the reservoir. The return flow of fluid from the brake cylinders can pass through check valve 5-47B unhindered by orifice 5-22.

Brake pressure reduction is also aided by the brake mode valve 5-12 which is signalled by control means 5-26A to present check valve 5-12A to conduit 1-8C. This action prevents pressure build up at point 5-29 by eliminating any command pressure to valve 5-21. It also cuts off any fluid supply to the brake cylinders through conduit 1-8C.

Brake control units 5-0 for the rear truck and 4-0 for the front truck produce equal output pressures within the tolerence of the weight distribution. Unequal pressures are sensed through the differential pressure analyzer 3-1. If the pressure inequality exceeds about 100 to 125 psi, a switch contact 3-5 or 3-6 is opened, signaling a non-catastropic brake system failure. Pump running switch 1-14 supplies similar information in case of pump failure. This information may be used to permit the car to run to the next station and then hold and would preclude an unscheduled emergency stop elsewhere in the system.

Orifice 5-54, FIG. 1A, limits the flow rate to the differential pressure analyzer 3-1 to prevent delay in operation of the brake cylinders.

Selective means 4-1 may be used to release brake pressure from the accumulator for the front end truck if required, similar to selective means 5-1 of the rear truck.

Both brake control units 4-0 and 5-0 have a suspension system pressure transducer shown as 5-32, FIG. 1A, to provide electrical load signals for proportional control and braking to control means 5-26A. These transducers utilize Bourdon tubes operating linear variable differential transducers. The input to the Bourdon tubes is from passenger sensor line 5-28A which is connected to an air line of the appropriate suspension system, which pressure varies with the weight in the car.

Brake cylinder pressure is monitored in the brake control unit by a transducer, installed on 5-50; the transducer can be a strain guage type.

As mentioned before brake control unit 5-0 for the rear truck is essentially similar to the brake control unit 4-0 for the front truck; consequently only a small portion of brake control unit 4-0 has been shown in FIG. 1C. The only difference is that front brake control unit 4-0 has a pressure transducer identical to 5-50, FIG. 1A, which is used for monitoring accumulator hydraulic pressure of the front truck accumulator.

Manual brake cutout is accomplished on either or both trucks by operating handle 5-43 or 4-43 of the selective means 5-1 or 4-1 to the cutout position. Operation of this handle permits check valve 5-41 to operate normally, and concurrently holds check valve 5-42 open. With the pump 1-5 not running, accumulator 5-13 loses its liquid to the reservoir through check valves 5-42 and 5-41 eliminating any possible brake pressure source on the truck. In the cutout position, check valve 5-41 prevents pump 1-5 from restoring brake fluid to the accumulator 5-13. Switch 5-44 operated by handle 5-43 also prevents switch 5-14 from turning on pump 1-5. Simultaneous operation of handles 4-43 and 5-43 to the cutout position prevents pump 1-5 from receiving a commany to run in any case and causes an immediate brake release on the car.

A feature of the brake mode valve 5-12 is that it can operate as an electrical means to turn off the brake system. For example, in case of a malfunction in a brake unit such as if the directional valve 5-21 is stuck or if there is a short circuit in the system, then a control switch can apply a signal to valve 5-12 causing it to close and thus stop fluid flow through line 1-8C to the brake cylinders or control system line. Another feature is to connect the air equalization pipe to the brake mode valve 5-12 to override valve 5-12 if there is not full pressure in the pipe, thus the brake mode valve will be kept open.

An automatic parking brake system uses motor 2-45A to operate parking brake valve means 2-45. Closing conduit 2-44 causes a brake application on both the front and rear end trucks but has a primary purpose of conserving brake fluid stored in the accumulators when the car is stopped and no 650 volt power is available for the pump or when the car is stopped and the operator's key is removed (lay-up mode). Should a loss of fluid occur at either truck when conduit 2-44 is closed, a similar loss of fluid at the other truck is stopped by check valves 2-46 and 2-47 which are opposed and placed so that fluid from rear return conduit 2-48 cannot enter the front return conduit 2-49 or vice-versa. In the automatic parking brake system valve 2-45 is signaled to close when the above conditions are met; in the manual parking brake mode valve 2-45 must manually be closed at the desired lay-up time or lack of power conditions.

CAR INSTALLATION

Figure 2A:
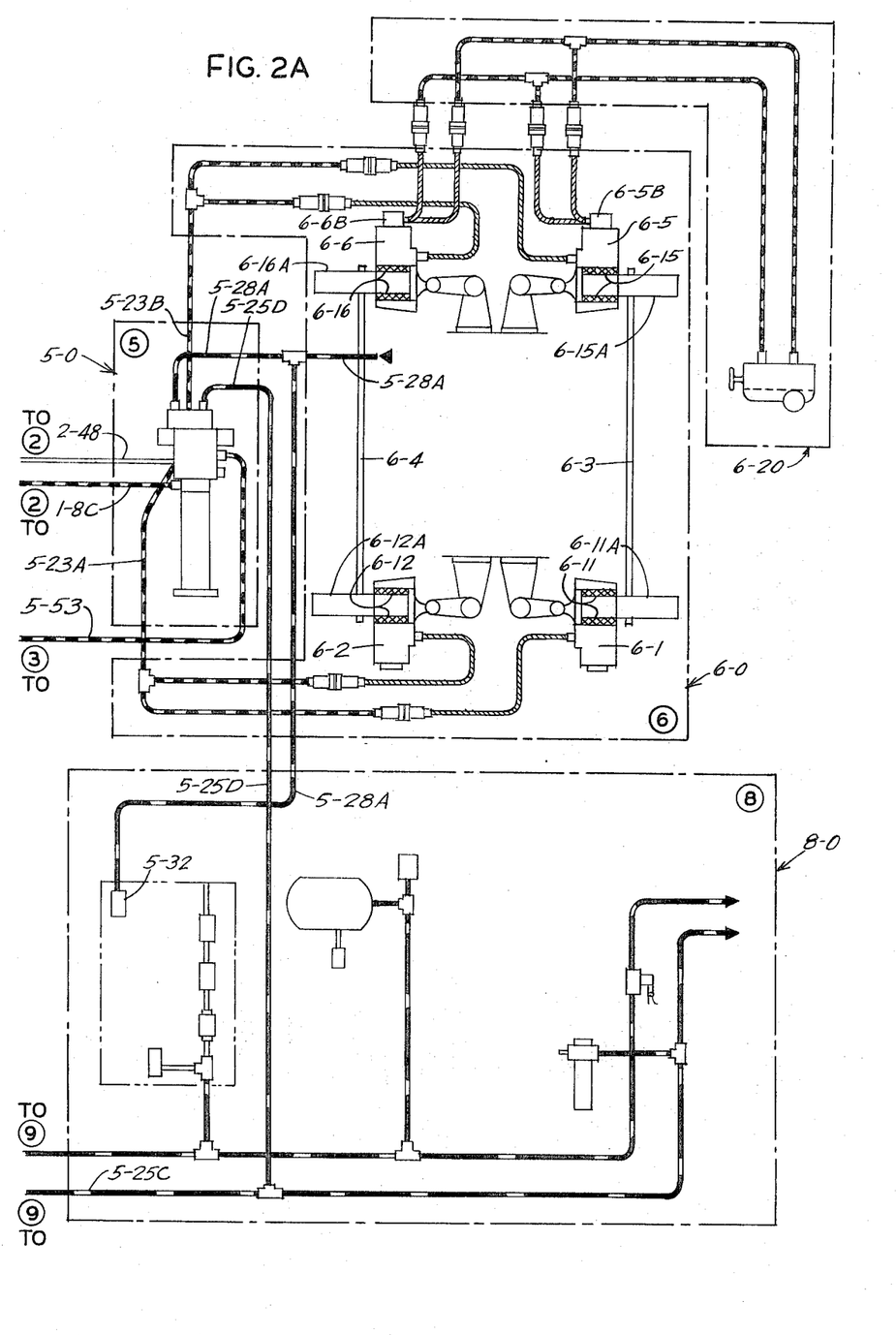

The installation of a braking system in a single railroad car is shown in FIGS. 2 and 2A. Hydraulic power unit 1-0 provides hydraulic fluid under pressure through the parking brake unit 2-0 into conduit 1-8C, note that in FIG. 2 conduit 1-8C is shown as providing hydraulic fluid to rear brake control unit 5-0 and front brake control unit 4-0. The front brake control unit 4-0 provides hydraulic fluid to the brake cylinders 7-0 of the front truck through lines 4-23A and 4-23B; the rear brake control unit 5-0 provides hydraulic fluid to the brake cylinders of the rear truck 6-0 through lines 5-23A and 5-23B. The hand brake 6-20 is not a part of the present invention and can be of conventional design.

Each car is equipped with disc brake pads and rotors: caliper-operated pads 6-11, 6-12, 6-15 and 6-16 for the rear truck 6-1, and pads 7-11, 7-12, 7-15 and 7-16 for the front truck which apply brake pressure from the related brake cylinders to the rotors 6-11A, 6-12A, 6-15A and 6-16A for the rear truck and 7-11A, 7-12A, 7-15A and 7-16A of the front truck. The brake rotors and the wheels of the rear and front trucks are connected by axles 6-3, 6-4 and 7-3, 7-4, respectively.

A small portion of braking fluid from each brake cylinder is provided to the differential pressure analyzer unit 3-0 through conduits 5-53 from the rear brake cylinder and 4-53 from the front brake cylinders.

The rear air suspension system 8 and the front air suspension system 9 do not constitute any part of this invention and the only inputs from these systems necessary to consider are, the air pressure from the air equilization pipe 5-25C communicating with the rear brake control unit through conduit 5-25D and with the front brake control unit through conduit 4-25D, and the passenger sensor lines, 5-28A for the rear brake control unit and 4-28A for the front brake control unit.

Finally, rear return conduit 2-48 and front return conduit 2-49 return hydraulic fluid to the reservoir in the hydraulic power unit 1-0. Interposed between these return conduits is the automatic parking brake means 2-1.

Accordingly, as has been mentioned previously, the relation of the front and rear trucks and the front and rear parking units can be seen. Both brake control units share the same hydraulic power unit 1-0 and parking brake unit 2-0. However, as mentioned, once the accumulators in the brake control units 4-0 and 5-0 are charged, each acts as a separate power source for the respective trucks.

In normal operation, at least two cars are required to form an operable train. These cars are usually classified as an A-car and a B-car and some of the various control components and air supply components are shared to lower the cost of the cars. It should be noted that the air equilization pipe 5-25C communicates with similar pipes in each car of the train running the entire length of the train. Thus, if the air pressure in the air equilization pipe should be released, all cars will go into the emergency braking mode as heretofore described. It should be noted that since the weight in each car will vary between the front and the rear, depending on passenger distribution, the passenger sensor lines for each of the front and rear trucks signals this to the control means 5-26A of FIG. 1A and braking pressure is increased or reduced on each truck accordingly. In a two car train, if any of the four trucks have a power systems failure by loss of normal operating conditions, for instance loss of 650 volt electricity, an emergency operation mode will be initiated which will either stop the train immediately or put the train in its fail-start condition according to the nature of the malfunction. Thus if one truck brake unit fails, 75 percent of the braking power of the train is still available for braking, increasing the safety of the braking system.

I claim:

1. In a braking system where brake pressure is applied by fluid-operated pistons in related brake cylinders:

an accumulator for storing fluid under pressure;
a reservoir for storing fluid not under pressure;
a pump means communicating with said accumulator and said reservoir for delivering fluid from said reservoir to charge said accumulator with fluid;
a continuously variable directional valve interposed between said brake cylinders, said accumulator, and said reservoir, said directional valve being settable in a first position allowing fluid from said accumulator to communicate with said brake cylinders, and being settable in a second position allowing fluid from said brake cylinders to communicate with said reservoir, and a null position blocking flow between the accumulator and brake cylinders and between the brake cylinders and the reservoir;

a control system line communicating with said accumulator, said reservoir and with said directional valve, capable of providing a first pilot pressure urging said directional valve to said first position, and capable of allowing flow of fluid from said accumulator to said reservoir;
a main control valve interposed in said control system line to variably restrict or enlarge flow through said control system line from said accumulator to said reservoir to vary said first pilot pressure;
an orifice interposed between said directional valve and said brake cylinders;
a release means capable of providing a second force in opposition to the force of said first pilot pressure, and urging said directional valve to said second position;

a control means which controls said main control valve so that when brake pressure is to be applied, said main control valve restricts flow through said control system line thereby increasing the force from said first pilot pressure above the force from said release means causing said directional valve to be set in said first position, and so that when brake pressure is to be released, said main control valve enlarges flow through said control system line thereby decreasing the force from said first pilot pressure below the force from said release means causing said directional valve to be set in said second position.

2. In a brake system where brake pressure is applied by fluid-operated pistons in related brake cylinders:

an accumulator for storing fluid under pressure;
a reservoir for storing fluid not under pressure;
a pump means communicating with said accumulator and said reservoir for delivering fluid from said reservoir to charge said accumulator with fluid;
a continuously variable directional valve interposed between said brake cylinders, said accumulator, and said reservoir, said directional valve being settable in a first position allowing fluid from said accumulator to communicate with said brake cylinders, and being settable in a second position allowing fluid from said brake cylinders to communicate with said reservoir, and a null position blocking flow between the accumulator and brake cylinders and between the brake cylinders and the reservoir;

a control system line communicating with said accumulator, said reservoir and with said directional valve, capable of providing a first pilot pressure urging said directional valve to said first position, and capable of allowing flow of fluid from said accumulator to said reservoir;
a main control valve interposed in said control system line to variably restrict or enlarge flow through said control system line from said accumulator to said reservoir to vary said first pilot pressure;
a release means capable of providing a second force in opposition to the force of said first pilot pressure, and urging said directional valve to said second position;
a control means which controls said main control valve so that when brake pressure is to be applied, said main control valve restricts flow through said control system line thereby increasing the force from said first pilot pressure above the force from said release means causing said directional valve to be set in said first position, and so that when brake pressure is to be released, said main control valve enlarges flow through said control system line thereby decreasing the force from said first pilot pressure below the force from said release means causing said directional valve to be set in said second position; and,
a parking brake means interposed in said control system line between said main control valve and said reservoir which is capable of completely blocking flow from said accumulator to said reservoir thereby increasing the force from said first pilot pressure above the force of said release means causing said directional valve to be set in said first position applying braking pressure until the pressure in said braking cylinders is substantially equal to the pressure of said accumulator.

3. A system as in claim 2 wherein said parking brake means includes a motorized valve which is normally closed, blocking fluid flow, and is maintained open during operation of said system by normal operating conditions.

4. A system as in claim 3 wherein said normal operating conditions include a sufficient electrical supply as measured by either current or voltage.

5. In a brake system where brake pressure is applied by fluid-operated pistons in related brake cylinders:
   an accumulator for storing fluid under pressure;
   a reservoir for storing fluid not under pressure;
   a pump means communicating with said accumulator and said reservoir for delivering fluid from said reservoir to charge said accumulator with fluid;
   a continuously variable directional valve interposed between said brake cylinders, said accumulator, and said reservoir, said directional valve being settable in a first position allowing fluid from said accumulator to communicate with said brake cylinders, and being settable in a second position allowing fluid from said brake cylinders to communicate with said reservoir, and a null position blocking flow between the accumulator and brake cylinders and between the brake cylinders and the reservoir;

a control system line communicating with said accumulator, said reservoir and with said directional valve, capable of providing a first pilot pressure urging said directional valve to said first position, and capable of allowing flow of fluid from said accumulator to said reservoir;
   a main control valve interposed in said control system line to variably restrict or enlarge flow through said control system line from said accumulator to said reservoir to vary said first pilot pressure;
   a release means capable of providing a second force in opposition to the force of said first pilot pressure, and urging said directional valve to said second position;
   a control means which controls said main control valve so that when brake pressure is to be applied, said main control valve restricts flow through said control system line thereby increasing the force from said first pilot pressure above the force from said release means causing said directional valve to be set in said first position, and so that when brake pressure is to be released, said main control valve enlarges flow through said control system line thereby decreasing the force from said first pilot pressure below the force from said release means causing said directional valve to be set in said second position; and,
   an emergency block valve interposed in said control system line between said main control valve and said directional valve which is normally closed, blocking fluid flow, and is maintained open during operation of said system by normal operating conditions;
   a moderating valve interposed in said control system line between said main control valve and said directional valve in parallel with said emergency block valve, which is normally closed, and is maintained open during operation of said system by abnormal operating conditions.

6. A system as in claim 5 including said braking pressure being applied to slow a pair of rotating axles which are affixed to wheels which roll upon a track, and said abnormal operating conditions which open said moderating valve include the skidding of any of the wheels upon the track.

7. A system as in claim 6 wherein said skidding is sensed by a difference in rotational speed between the axles.

8. A system as in claim 6 wherein said skidding is sensed by a difference in deceleration between the axles.

9. A system as in claim 6 wherein said moderating valve is a two position valve and said moderating valve is opened when abnormal skidding is detected, whereby said main control valve controls application of brake pressure.

10. A system as in claim 9 wherein said main control valve opens proportional to the magnitude of the abnormal operating condition.

11. In a brake system where brake pressure is applied by fluid-operated pistons in related brake cylinders:
    an accumulator for storing fluid under pressure;
    a reservoir for storing fluid not under pressure;
    a pump means communicating with said accumulator and said reservoir for delivering fluid from said reservoir to charge said accumulator with fluid;
    a shuttle valve communicating with said pump, said accumulator, and said reservoir, said shuttle valve allowing flow from said pump to said accumulator whenever the pressure between said pump and said shuttle valve is greater than the pressure between said shuttle valve and said accumulator, and allowing flow from said accumulator to said reservoir whenever the pressure between said accumulator and said shuttle valve is greater than the pressure between said shuttle valve and said pump;
    a continuously variable directional valve interposed between said brake cylinders, said accumulator, and said reservoir, said directional valve being settable in a first position allowing fluid from said accumulator to communicate with said brake cylinders, and being settable in a second position allowing fluid from said brake cylinders to communicate with said reservoir, and a null position blocking flow between the accumulator and brake cylinders and between the brake cylinders and the reservoir;

a control system line communicating with said accumulator, said reservoir and with said directional valve, capable of providing a first pilot pressure urging said directional valve to said first position, and capable of allowing flow of fluid from said accumulator to said reservoir;
    a main control valve interposed in said control system line to variably restrict or enlarge flow through said control system line from said accumulator to said reservoir to vary said first pilot pressure;
    a release means capable of providing a second force in opposition to the force of said first pilot pressure, and urging said directional valve to said second position;
    a control means which controls said main control valve so that when brake pressure is to be applied, said main control valve restricts flow through said control system line thereby increasing the force from said first pilot pressure above the force from said release means causing said directional valve to be set in said first position, and so that when brake pressure is to be released, said main control valve enlarges flow through said control system line thereby decreasing the force from said first pilot pressure below the force from said release means causing said directional valve to be set in said second position.

12. A system as in claim 11 wherein a spring loaded check valve allowing flow from said pump to said shuttle valve is interposed between them.

13. A system as in claim 12 wherein a check valve allowing flow from said shuttle valve to said accumulator is interposed between them.

14. In a brake system where brake pressure is applied by fluid-operated pistons in related brake cylinders:
an accumulator for storing fluid under pressure;
a reservoir for storing fluid not under pressure;
a pump means communicating with said accumulator and said reservoir for delivering fluid from said reservoir to charge said accumulator with fluid;
a shuttle valve communicating with said pump, said accumulator, and said reservoir, said shuttle valve allowing flow from said pump to said accumulator whenever the pressure between said pump and said shuttle valve is greater than the pressure between said shuttle valve and said accumulator, and allowing flow from said accumulator to said reservoir whenever the pressure between said accumulator and said shuttle valve is greater than the pressure between said shuttle valve and said pump;
a continuously variable directional valve interposed between said brake cylinders, said accumulator, and said reservoir, said directional valve being settable in a first position allowing fluid from said accumulator to communicate with said brake cylinders, and being settable in a second position allowing fluid from said brake cylinders to communicate with said reservoir, and a null position blocking flow between the accumulator and brake cylinders and between the brake cylinders and the reservoir;

a control system line communicating with said accumulator, said reservoir and with said directional valve, capable of providing a first pilot pressure urging said directional valve to said first position, and capable of allowing flow of fluid from said accumulator to said reservoir;
a main control valve interposed in said control system line to variably restrict or enlarge flow through said control system line from said accumulator to said reservoir to vary said first pilot pressure;
an orifice interposed between said directional valve and said brake cylinders;
a release means capable of providing a second force in opposition to the force of said first pilot pressure, and urging said directional valve to said second position;
a control means which controls said main control valve so that when brake pressure is to be applied, said main control valve restricts flow through said control system line thereby increasing the force from said first pilot pressure above the force from said release means causing said directional valve to be set in said first position, and so that when brake pressure is to be released, said main control valve enlarges flow through said control system line thereby decreasing the force from said first pilot pressure below the force from said release means causing said directional valve to be set in said second position; and,
a parking brake means interposed in said control system line between said main control valve and said reservoir which is capable of completely blocking flow from said accumulator to said reservoir thereby increasing the force from said first pilot pressure above the force of said release means causing said directional valve to be set in said first position applying braking pressure until the pressure in said braking cylinders is substantially equal to the pressure of said accumulator;
an emergency block valve interposed in said control system line between said main control valve and said directional valve which is normally closed, blocking fluid flow, and is maintained open during operation of said system by normal operating conditions;
a moderating valve interposed in said control system line between said main control valve and said directional valve in parallel with said emergency block valve, which is normally closed, and is maintained open during operation of said system by abnormal operating conditions.

15. Brake systems as in claim 14 applying brake pressure to the wheels of a front and rear truck, each brake system including:
opposed first and second check valves interposed between said shuttle valve and said accumulator and directional valve whereby fluid from said shuttle valve may only pass to said accumulator and directional valve when said first check valve is held open, and fluid may only pass from said accumulator and directional valve to said shuttle valve when said second check valve is held open; and,
a selective means to alternately hold open either first or second check valve whereby either front or rear or both trucks can be disabled from braking.

16. Brake systems as in claim 14 applying brake pressure to the wheels of a front and rear truck, including:

a differential pressure analyzer means interposed between said front and rear braking systems so as to be able to sense the pressure of the fluid in both the front and rear brake cylinders and produce an emergency signal when the difference between the pressure of said front and rear brake cylinders exceeds a predetermined value.

17. A brake system as in claim 14 including:
a suspension system containing a fluid under pressure where said pressure increases as the weight carried by said suspension system increases; and,
an overload relief valve communicating with said accumulator, said reservoir, said control system line and pressure from said suspension system and capable of providing a path for fluid flow from said accumulator to said reservoir parallel to the path through said main control valve, and which is urged closed by a bias spring and pressure from said suspension system thereby blocking fluid flow between said accumulator and said reservoir, and which is urged open by pressure from said control system line thereby allowing fluid to flow from said accumulator to said reservoir.

18. A brake system as in claim 17 which requires a pressure in said control system line to be the maximum amount necessary to stop a suspension system carrying its minimum weight in order to overcome said bias spring force and open said overload relief valve.

19. A brake system as in claim 18 which requires pressure in said control system line to be the maximum amount necessary to stop a suspension system carrying a load in order to overcome the combined forces of said bias spring and said pressure from said suspension system wherein the maximum amount of pressure in said control system line is proportional to the pressure in said suspension system.

20. A brake system as in claim 19 wherein said overload relief valve regulates the control system line pressure when said emergency block valve is closed.

21. A brake system as in claim 20 wherein said moderating valve operates to proportionally release pressure when skidding is detected.

22. Brake systems as in claim 20 applying brake pressure to the wheels of a front and rear truck of a railroad car, so that the brake pressure applied to each truck is proportional to the load carried by each suspension system of the respective truck.

23. A brake system as in claim 22 wherein the load on each suspension system varies due to passenger or cargo distribution in the car.

24. Brake systems as in claim 17 applying brake pressure to the wheels of a front and rear truck, each brake system including:
   opposed first and second check valves interposed between said shuttle valve and said accumulator and directional valve whereby fluid from said shuttle valve may only pass to said accumulator and directional valve when said first check valve is held open, and fluid may only pass from said accumulator and directional valve to said shuttle valve when said second check valve is held open; and,
   a selective means to alternately hold open either first or second check valve whereby either front or rear or both trucks can be disabled from braking.

25. Brake systems as in claim 17 applying brake pressure to the wheels of a front and rear truck, including:

a differential pressure analyzer means interposed between said front and rear braking systems so as to be able to sense the pressure of the fluid in both the front and rear brake cylinders and produce an emergency signal when the difference between the pressure of said front and rear brake cylinders exceeds a predetermined value.

26. Brake systems as in claim 15 applying brake pressure to the wheels of a front and rear truck, including:

a differential pressure analyzer means interposed between said front and rear braking systems so as to be able to sense the pressure of the fluid in both the front and rear brake cylinders and produce an emergency signal when the difference between the pressure of said front and rear brake cylinders exceeds a predetermined value.

27. Brake systems as in claim 24 applying brake pressure to the wheels of a front and rear truck, including:

a differential pressure analyzer means interposed between said front and rear braking systems so as to be able to sense the pressure of the fluid in both the front and rear brake cylinders and produce an emergency signal when the difference between the pressure of said front and rear brake cylinders exceeds a predetermined value.

28. A brake system as in claim 14 including a brake mode valve interposed between and communicating with said accumulator, and said directional valve and said control system line including an electrical control means which is capable of closing said brake mode valve, thereby blocking fluid flow from said accumulator to said directional valve or said control system line.

29. A brake system as in claim 28 including a pneumatic means to override said brake mode valve and open said brake mode valve thereby allowing fluid flow from said accumulator to said directional valve or said control system line when abnormal operating conditions are sensed.

30. A brake system as in claim 29 used in a train wherein said pneumatic means includes an air equalization pipe connecting all the cars of the train and where said abnormal operating conditions include less than full air pressure is said air equalization pipe.

* * * * *